(12) United States Patent
He et al.

(10) Patent No.: US 7,511,857 B2
(45) Date of Patent: Mar. 31, 2009

(54) HALFTONING METHOD AND SYSTEM

(75) Inventors: Zhen He, Tigard, OR (US); Charles A. Bouman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 10/764,839

(22) Filed: Jan. 26, 2004

(65) Prior Publication Data
US 2005/0162704 A1 Jul. 28, 2005

(51) Int. Cl.
*H04N 1/405* (2006.01)
(52) U.S. Cl. .................................... 358/3.17; 358/3.13
(58) Field of Classification Search ................ 358/1.9, 358/2.1, 3.09–3.14, 3.16–3.17, 3.06
See application file for complete search history.

(56) References Cited

U.S. PATENT DOCUMENTS

| 5,019,896 | A | * | 5/1991 | Shimazaki | .................. | 358/534 |
| 5,754,311 | A | * | 5/1998 | Ray | .......................... | 358/3.14 |
| 5,855,433 | A |   | 1/1999 | Velho et al. | | |
| 5,892,588 | A | * | 4/1999 | Samworth | .................. | 358/3.19 |
| 6,108,450 | A |   | 8/2000 | Ueda | | |
| 6,249,355 | B1 | * | 6/2001 | Trask | .......................... | 358/1.9 |
| 7,031,025 | B1 |   | 4/2006 | He et al. | | |
| 2004/0051906 | A1 |   | 3/2004 | Engbrocks et al. | | |

FOREIGN PATENT DOCUMENTS

| DE | 101 36 357 | 3/2002 |
| JP | 01-047546 A | 2/1989 |
| JP | 04-158680 A | 6/1992 |
| JP | 04-159862 A | 6/1992 |
| JP | 07-250240 A | 9/1995 |
| WO | WO 02/51125 | 6/2002 |

OTHER PUBLICATIONS

EuropeanSearch Report for Application No. 05001471.1-1228.

* cited by examiner

*Primary Examiner*—Thomas D Lee
*Assistant Examiner*—Stephen M Brinich (57) ABSTRACT

A combined dot density (FM) and dot size (AM) modulation halftoning method and system produces a halftone in which both the density and size of the dots are modulated. In addition to modulating the dot size and density, the halftoning method can also explicitly control the size of dot clusters and different intensity levels.

27 Claims, 7 Drawing Sheets

HALFTONING METHOD AND SYSTEM

BACKGROUND

A digital image can be represented as a matrix of picture elements commonly referred to as pixels. Each pixel has a corresponding intensity value. For an eight bit "continuo us tone" gray scale image, that value can range from zero to two hundred fifty-five with zero representing white, two hundred fifty-five representing black, and the intermediate values representing varying levels of gray.

The digital image must be processed before it can be printed. A conventional black and white laser printer forms the image on a sheet of paper or other media by placing clusters of dots at selected locations on the sheet. Because printers cannot print continuous tones—whether it's the many shades of gray in a grayscale image or the millions of colors in a color photograph—digital images must be converted to halftones. This process is called halftoning or dithering.

Traditional halftoning methods change either the size of printed dots or the relative density of dots on the page. These two approaches are analogous to amplitude modulation (AM) or frequency modulation (FM) used in communications. For example, black and white continuous tone photographs can contain millions of shades of gray. When printed these shades of gray are converted to a pattern of black dots that simulates the continuous tones of the original image. Simply put, lighter shades of gray are composed of fewer or smaller black dots spaced further apart. Darker shades of gray contain more or larger black dots closely spaced.

With AM halftoning, the density of dot clusters, defined as the number of clusters of dots per unit area, is fixed. Tone rendition is achieved by varying the size of each dot. The most commonly used AM halftoning algorithm is clustered dot screening. Cluster dot screening has the advantages of low computational load, stable dot formation, and good resistance to such printer artifacts as dot gain and banding. Thus, it is widely used in laser printers where a single isolated dot may not develop stably. However, there are several drawbacks to AM halftoning. First, there is the well known tradeoff between the number of gray levels that can be rendered and the size of a screen period. Second, the regular dot placement in highlight regions may be very visible, and can cause Moiré artifacts when periodic patterns in the image are similar to the clustered dot frequency. This can be problematic when rendering images scanned from printed material.

With FM halftoning, the dot size is fixed and the tone rendition is achieved by varying the dot density. Commonly used FM halftoning algorithms include dispersed-dot screening, error diffusion, and search-based halftone methods such as direct binary search (DBS). Error diffusion is perhaps the most popular FM halftoning algorithm. Though it requires more computation as compared to screening, it is still very efficient. In general, FM halftoning achieves higher spatial resolution than AM halftoning and is free of Moiré artifacts. However, it can lack the print stability required for electrophotographic printing.

The characteristics of AM and FM methods are complementary to each other. However, traditional halftoning methods take an either/or approach. What is needed is a printing method and system that can take advantage of both methods while avoiding their drawbacks.

DETAILED DESCRIPTION

Various embodiments of the invented halftoning method modulate both dot size (AM modulation) and dot density (FM modulation). In addition to modulating the dot size and density, the halftoning method can also explicitly control the size of dot clusters at different intensity levels. Experiments demonstrate that "clustered" AM/FM halftoning can achieve high spatial resolution, smooth halftone textures, good printing stability, and Moiré resistance.

The terms digital image and halftone are used throughout the following description. A digital image is an electronic matrix of pixels selected and arranged to reveal any combination of text and/or graphics. Each pixel has an intensity value. For example, in an eight bit gray scale image, the intensity value for each pixel can range from zero to two hundred fifty five. To the human eye, the difference between one shade of gray and the next is not perceivable, so an eight-bit gray scale image can be though of as a continuous tone image. To be printed, a digital image must first go though a halftoning (dithering) process. The processed digital image is referred to as a halftone. The printed digital image can also be referred to as a halftone The description that follows is broken into sections. The first section, labeled "Environment," describes an exemplary computing environment in which embodiments of the present invention may be implemented. The second section, labeled "Components," describes exemplary logical and physical elements used to implement various embodiments of the present invention. The next section, labeled "Operation," describe s exemplary steps taken to practice various embodiments of the present invention. The last section, labeled "Look-Up Tables," describes a method for designing look-up tables that can be used by embodiments of the invented halftoning method and system.

Figure 1:
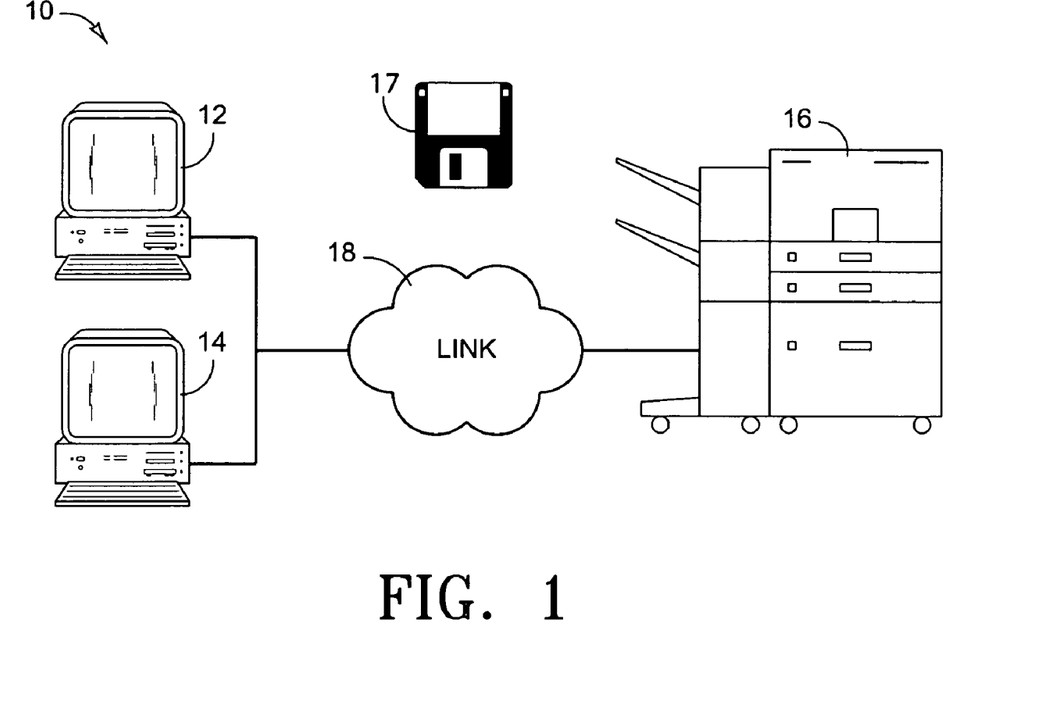
FIG. 1 is a schematic representation of a computing environment in which embodiments of the present invention may be incorporated.

Environment: FIG. 1 illustrates a printing environment 10 in which it would be advantageous to implement embodiments of the present invention. Environment 10 includes computers 12 and 14, image forming device 16, and computer readable media 17. Computers 12 and 14 represent generally any computing device such as a desktop computer, laptop computer, or PDA (Personal Digital Assistant) that may send a print job to image forming device 16. Image forming device 16 represents generally any combination of hardware and programming capable of processing a print job and producing an image such as text and graphics on a media sheet such as paper or transparency. Examples include printers, copiers, and facsimile machines as well as multi-function devices that provide all three functions. It is noted that where an image forming device functions as a copier, it can create a print job without the need for computers 12 and 14.

Computer readable media 17 represents generally any media that can be used by or in connection with an instruction execution system such as a computer/processor based system or an ASIC (Application Specific Integrated Circuit) or other system that can fetch or obtain the logic from computer-readable media 17 and execute the instructions contained therein. While shown as a diskette, computer-readable media 17 can be any media that can contain, store, or maintain programs and data for use by or in connection with the instruction execution system. Computer readable media 17 can comprise any one of many physical media such as, for example, electronic, magnetic, optical, electromagnetic, infrared, or semiconductor media. More specific examples of suitable computer-readable media 17 include, but are not limited to, a portable magnetic computer diskette such as floppy diskette or hard drives, a random access memory (RAM), a read-only memory (ROM), an erasable programmable read-only memory, or a portable compact disc.

Computers 12 and 14 and image forming device 16 are interconnected by link 18. Link 18 represents generally a cable, wireless, or remote connection via a telecommunication link, an infrared link, a radio frequency link, and/or any other connector or system that provides electronic communication between devices 12-16. Link 18 may represent an intranet, the Internet, or a combination of both.

The term print job refers to a series of instructions directing image forming device 16 to produce images on one or more media sheets. The instructions may include directions to form text, graphics, or a combination of both. A print job may be generated by computer 12 or 14 or directly by image forming device 16 where image forming device 16 functions as a copier. The instructions may also include finishing directions such as directions to print multiple collated copies.

Components: The logical components of one embodiment of the invention will now be described with reference to the block diagrams of FIGS. 2-4. Beginning with FIG. 2, image forming device 16 includes, among other components not shown, print engine 24, memory 26, and control logic 28.

Figure 2:
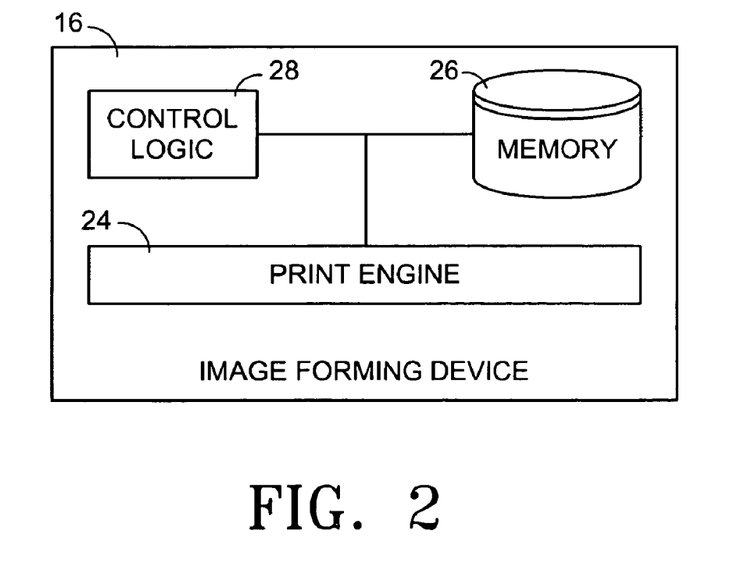
FIG. 2 is a block diagram illustrating components of an image forming device in which embodiments of the present invention may be incorporated.

Print engine 24 represents hardware and programming capable of utilizing print job data to print images on media sheets. Where, for example, image forming device 16 is a laser printer, print engine 24 includes an optical scanner, a photo conducting drum, toner and a fuser. The optical scanner modulates a laser beam across the drum according to halftone print code generated by control logic 28. The scanned portions of the drum attract toner. Toner is transferred from the drum to a media sheet forming the desired image. The fuser permanently adheres the toner to the media sheet.

Memory 26 represents generally any memory to which electronic data can be written and retrieved. For example, memory 26 may be random access memory, flash memory, a hard disk, or any combination thereof. Control logic 28 represents generally any program capable of processing a print job and sending halftone print code to print engine 24. As used here, halftone print code refers to electronic instructions capable of being processed by print engine 24 to produce a replica of a digital image.

When received by image forming device 16, a print job is typically in PDL (Page Description Language) format. The PDL format describes the layout and contents of a printed page or pages. Modern versions of the PDL format are object-oriented, meaning that they describe a page in terms of geometrical objects such as lines, arcs, and circles. Control logic 28 is responsible for converting a print job into halftone print code that can be used by print engine 24. Processing includes rendering the print job into a halftone.

Figure 3:
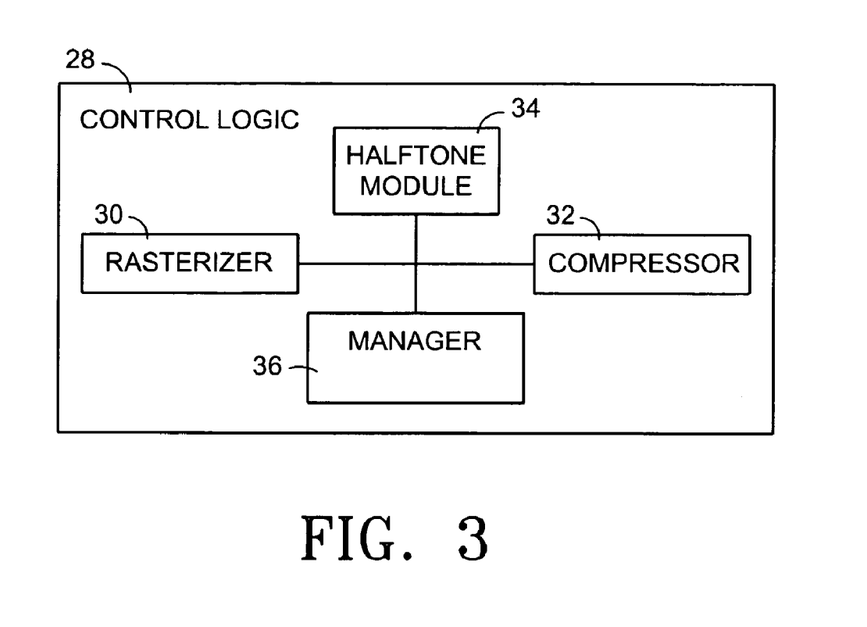
FIG. 3 is a block diagram illustrating control logic components in which embodiments of the present invention may be incorporated.

Referring now to FIG. 3, control logic 28 includes rasterizer 30, compressor 32, halftone module 34, and manager 36. Rasterizer 30 represents generally any program capable of rendering a print job into one or more digital images with each digital image representing a page or portion of a page to be printed. A digital image that defines the location and properties of each pixel can be quite large and can quickly deplete memory 26. Compressor 32 represents any program capable of compressing a digital image into a more manageable size. Compressor 32 is also responsible for decompressing.

Halftone module 34 represents a program capable of converting a digital image to a halftone capable of being printed by print engine 24—the halftone defining the properties of each dot to be printed by print engine 24. Manager 36 represents any program capable of writing a compressed digital image to memory 26 and retrieving compressed digital image from memory 26 so that it can be decompressed by compressor 32 and forwarded to halftone module 34.

Figure 4:
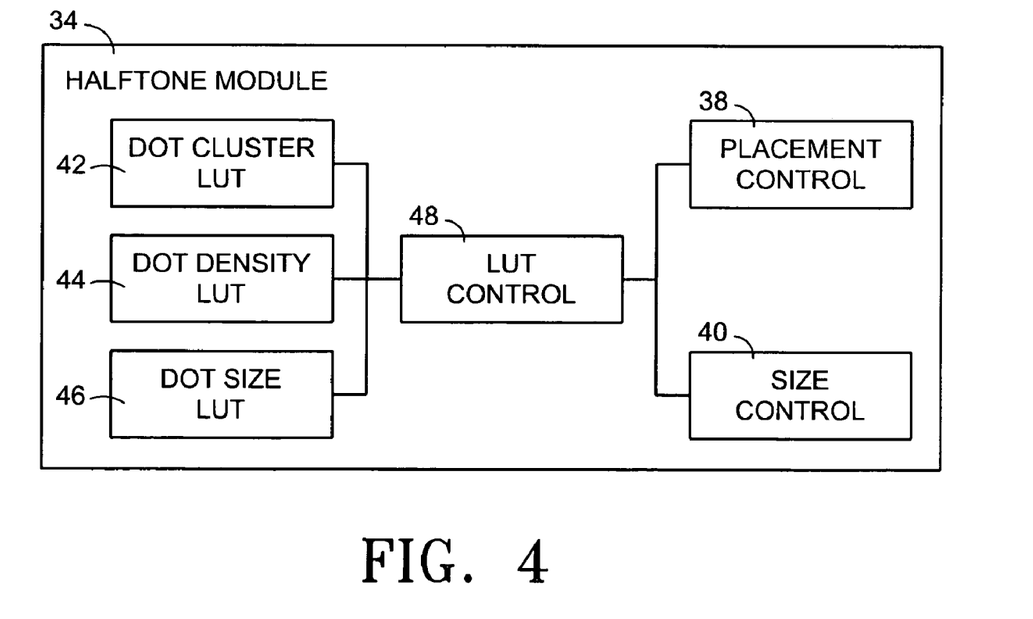
FIGS. 4-5 are block diagrams illustrating a halftone module and look-up tables according to embodiments of the present invention.

FIG. 4 is an exemplary diagram illustrating the logical components of halftone module 34. As shown, halftone module 34 includes placement control 38, and size control 40. A halftone can be thought of as a two dimensional matrix of cells organized into rows and columns. Each cell may or may not contain a dot. Placement control 38 represents a program capable determining which cells of a halftone will contain dots. In other words, placement control 38 is responsible for FM modulation. Placement control 38 is also responsible for controlling the size of dot clusters. For those halftone cells determined to contain dots, size control 40 represents a program capable of specifying the size and placement of each dot within its given cell. This can be referred to as AM modulation. Examples of particular techniques used by placement control 38, and size control 40 are described below.

Halftone module 34 also includes dot cluster look-up table (LUT) 42, dot density LUT 44, dot size LUT 46, and look-up table control 48. Each of LUTs 42-46 include a number of entries with each entry corresponding to a pixel intensity value. Each entry includes data that can be used when converting a digital image to a halftone. Each entry in cluster LUT 42 contains data representing a cluster factor corresponding to a given pixel intensity value or range of pixel intensity values. Each entry in dot density LUT 44 contains data representing a dot density factor corresponding to a given pixel intensity value or range of pixel intensity values. A cluster factor and a dot density factor are used by placement control 38 to help determine whether a given cell in a halftone will contain a dot and the size of a particular dot cluster. Each entry in dot size LUT 46 contains data representing a dot size factor corresponding to a given pixel intensity value or range of intensity values.

Figure 5:
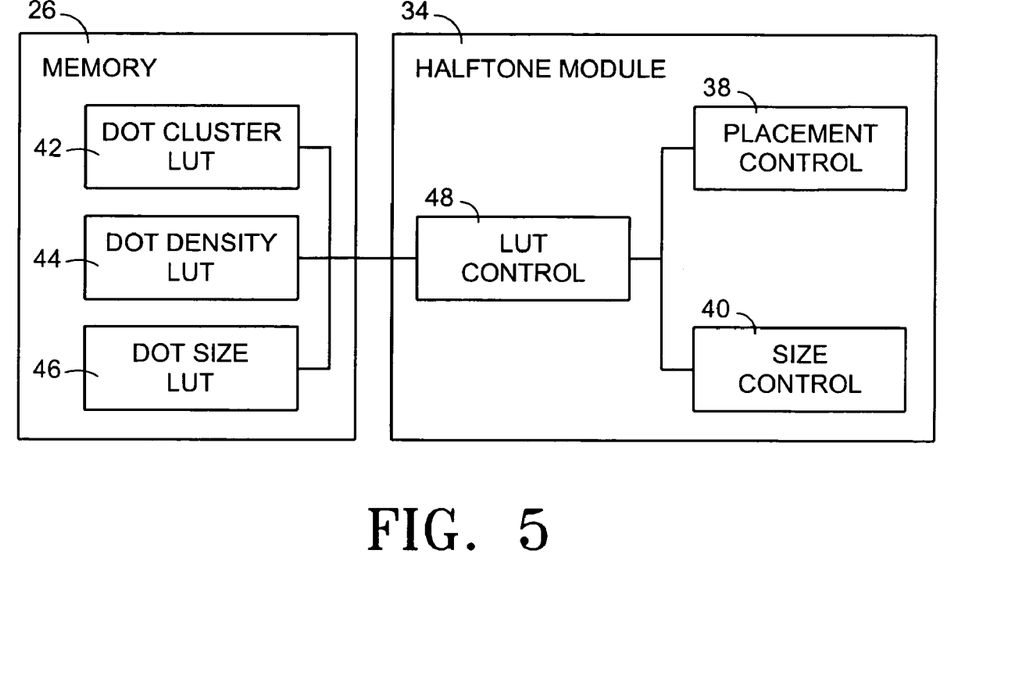

A size factor is used by size control 40 to specify the size of a dot contained in a given halftone cell. Look-up control 48 represents generally any program capable of locating an entry in each LUT 42-46 that corresponds to an intensity value of a given pixel. Look-up control 48 is also responsible for retrieving data from each located entry. Referring to FIG. 5, it is noted that LUTs 42-46 might not be part of halftone module 34 and may instead be stored in memory 26 or another suitable location accessible to LUT control 48.

It is noted that LUTs 42-46 may be replaced with a single combined LUT (not shown). Each entry in the combined LUT would correspond to a pixel intensity or range of pixel intensities and would contain a cluster factor, a dot density factor, and a dot size factor.

Figure 6:
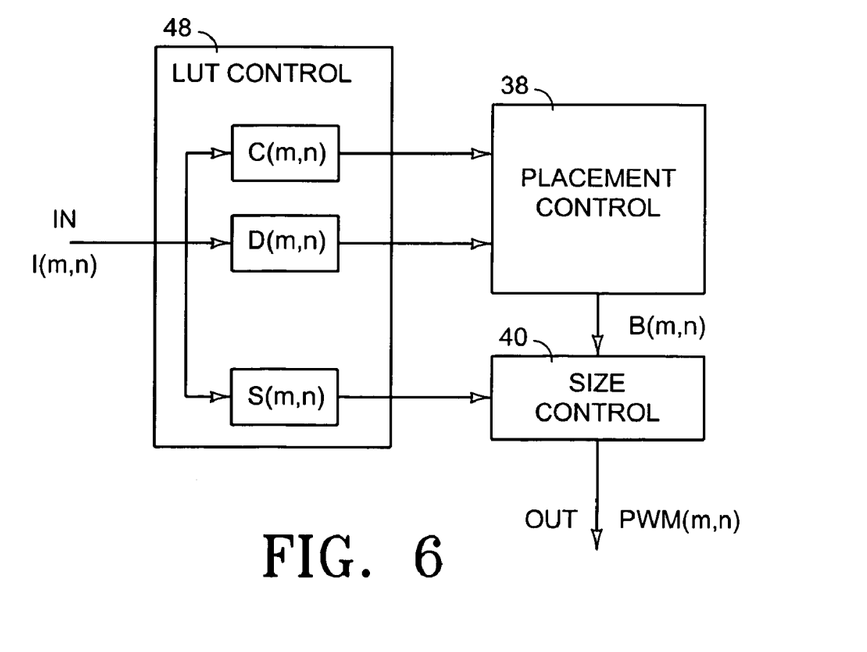
FIG. 6 is a block diagram illustrating the logical components of a halftone module in action according to an embodiment of the present invention.

Referring now to FIG. 6, imagine a digital image made up of a matrix of pixels arranged in columns and rows. Each pixel can be represented as P(m,n) where m and n represent the respective column and row containing the pixel. A pixel's intensity value can be identified as I(m,n). When processing a digital image to create a halftone, the pixels making up the digital image are examined sequentially. For each pixel, P(m,n), look-up control 48 locates an entry in dot cluster LUT 42 corresponding the intensity value I(m,n) for that pixel and retrieves a cluster factor, C(m,n), from that entry. In a similar manner, look-up control 48 retrieves a dot density factor, D(m,n), from dot density LUT 44 and a dot size factor, S(m,n), from dot size LUT 46.

It is noted that instead of acquiring factors C(m,n), D(m,n), and S(m,n) from LUTs 42-46, placement control might calculate C(m,n) and D(m,n) as a function of the intensity of pixel P(m,n). Similarly, size-control 40 might calculate S(m,n) as a function of pixel intensity.

Using the retrieved factors, C(m,n) and D(m,n), placement control 38 determines whether a dot is to be placed in a halftone cell corresponding to the given pixel, P(m,n). This determination is represented by a dot placement indicator, B(m,n). B(m,n) can have a value of zero or one. A value of one indicates that a dot is to be placed. A zero value indicates that no dot is to be placed. Using the retrieved factor S(m,n) and the variable B(m,n), size control 40 determines the size of the dot to be placed. This output, referred to above as halftone print code, is represented by the variable HPC(m,n) and is sent to print engine 24. HPC(m,n), for example may be a pulse width modulation (PWM) code used by print engines of laser printers produced by the Hewlett-Packard Company.

Figure 7:
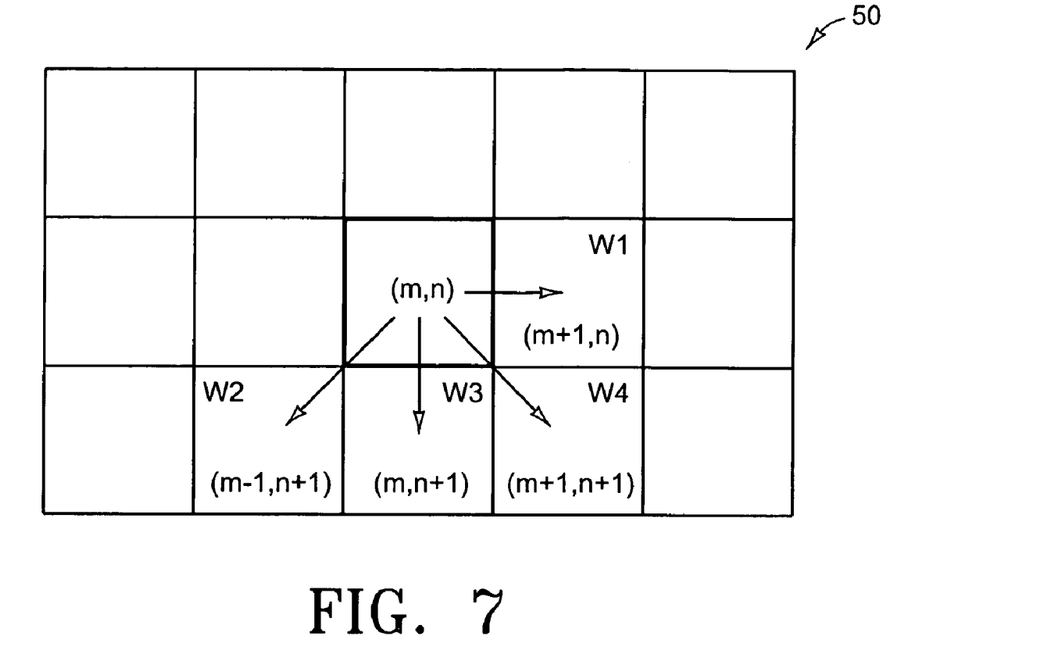
FIGS. 7 and 8 help illustrate a traditional error diffusion process.
Figure 8:
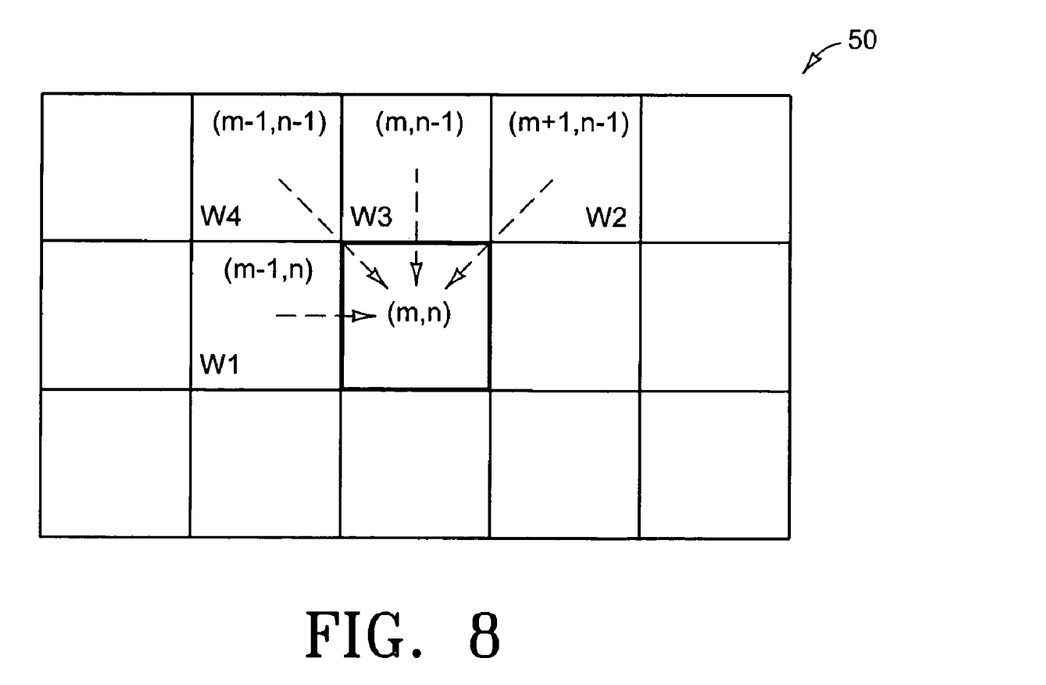

Dot placement indicator, B(m,n), can be calculated using an error diffusion algorithm. FIGS. 7 and 8 help illustrate a traditional approach to error diffusion while examples of particular techniques used by placement control 38 are described in the following section with reference to FIGS. 9 and 10.

FIG. 7 illustrates a five-by-three matrix of cells 50 with cell (m,n) located in its center. Cell (m,n) corresponds to a pixel P(m,n) of a given digital image. As noted above, the value of B(m,n) determines whether or not a dot will be placed in cell (m,n). B(m,n) is set to one if the adjusted intensity values (discussed below) of P(m,n) meets or exceeds a threshold value. If not, B(m,n) is set to zero.

Imagine, for example, that P(m,n) is a pixel in an eight bit gray scale image. Its intensity value can range from zero to two hundred fifty-five. A threshold value may be set at one hundred twenty seven. A dot is placed in cell (m,n) only if the adjusted intensity value for P(m,n) is at least one hundred twenty-seven. On an eight bit scale, a cell with a dot has an intensity value of two-hundred fifty five. A cell without a dot has an intensity value of zero. Assume that the adjusted intensity value for P(m,n) is one hundred forty-five, exceeding the threshold value. Consequently, a dot will be placed, and cell (m,n) will have an intensity value of two hundred fifty-five—substantially larger that the intensity level of P(m,n). This difference in intensity values is referred to as an error, e(m,n). The error can be calculated by the equation: e(m,n)=pixel intensity minus dot intensity. In the example, e(m,n)=145−255=−110.

This error can be diffused by shifting portions of the error to cells adjacent to cell (m,n). As seen in the example of FIG. 7, varying portions of the error are shifted to the following four cells (m+1,n), (m−1,n+1), (m,n+1), and (m+1,n+1). The portion shifted to a given cell depends upon a weighting factor, W. The number of weighting factors equals the number of cells to which the error is shifted. In FIG. 7 there are four weighting factors—W(1), W(2), W(3), and W(4)—and the error e(m,n) is diffused as follows:

W(1)*e(m,n) is added to the intensity value for (m+1,n);
W(2)*e(m,n) is added to the intensity value for (m−1,n+1);
W(3)*e(m,n) is added to the intensity value for (m,n+1); and
W(4)*e(m,n) is added to the intensity value for (m+1,n+1).

The sum of the weighting factors should equal one. For example W(1) might equal 7/16, W(2) might equal 1/16, W(3) might equal 5/16, and W(4) might equal 3/16 so that W1+W2+W3+W4=1.

As the error, e(m,n), is diffused, the intensity value for certain cells adjacent to (m,n) are adjusted. Referring now to FIG. 8, before determining whether a dot will be placed in cell (m,n), the intensity value for P(m,n) is adjusted by adding the weighted errors from cells (m−1,n), (m−1,n−1), (m,n−1), and (m+1,n−1). The adjusted intensity value for P(m,n) can be represented by the variable $I_A(m,n)$ where $I_A(m,n)$=I(m,n)+W1*e(m-1,n)+W2*e(m+1,n−1)+W3*e(m,n−1)+W4*e(m−1,n−1). It is this adjusted intensity value that is used to determine the value of B(m,n) and whether a dot is to be placed in cell (m,n).

Figure 9:
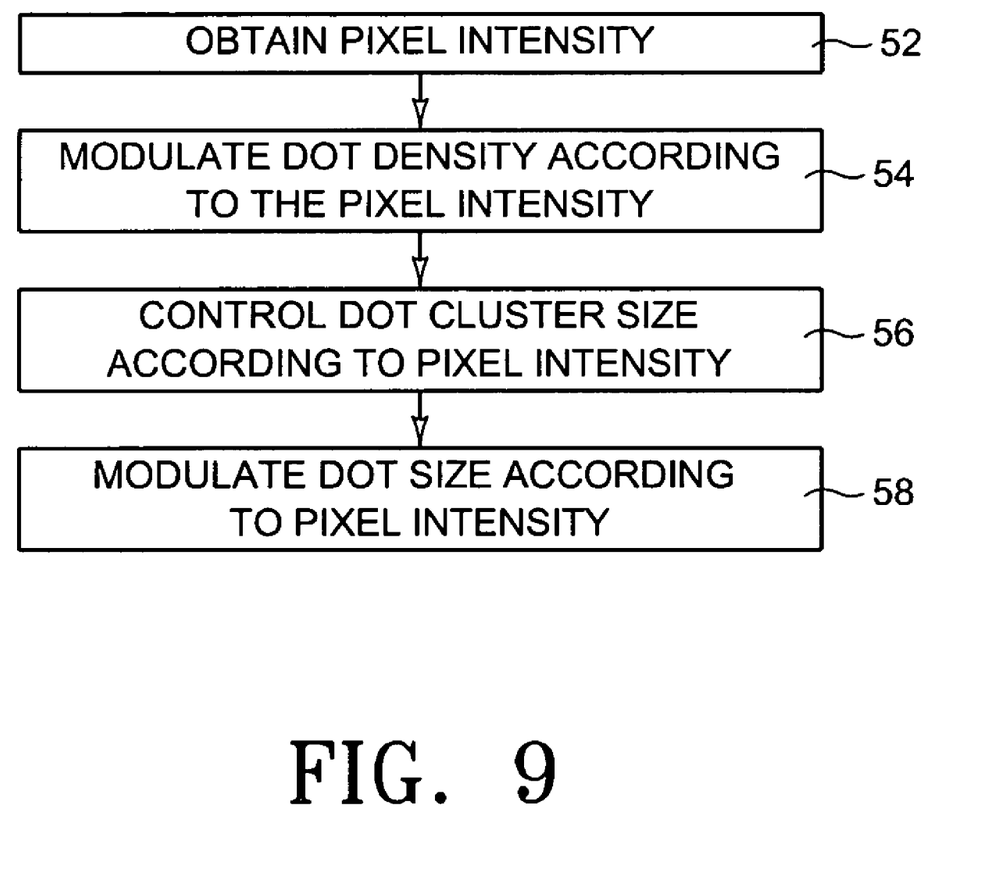
FIG. 9 is a flow diagram illustrating steps taken to generate a halftone according to an embodiment of the present invention.
Figure 10:
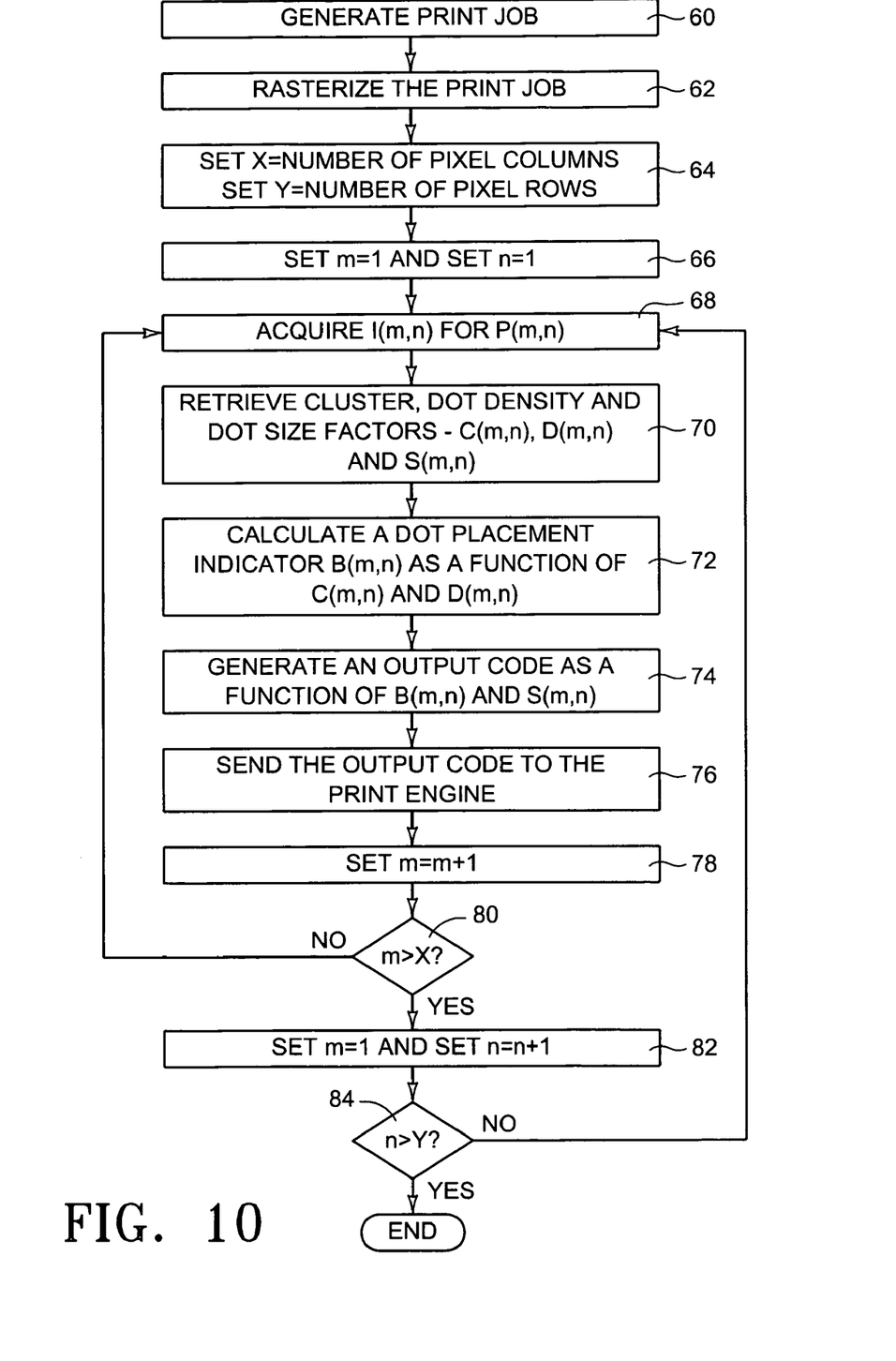
FIG. 10 is a flow diagram illustrating steps taken to produce and print a halftone according to an embodiment of the present invention.
Figure 11:
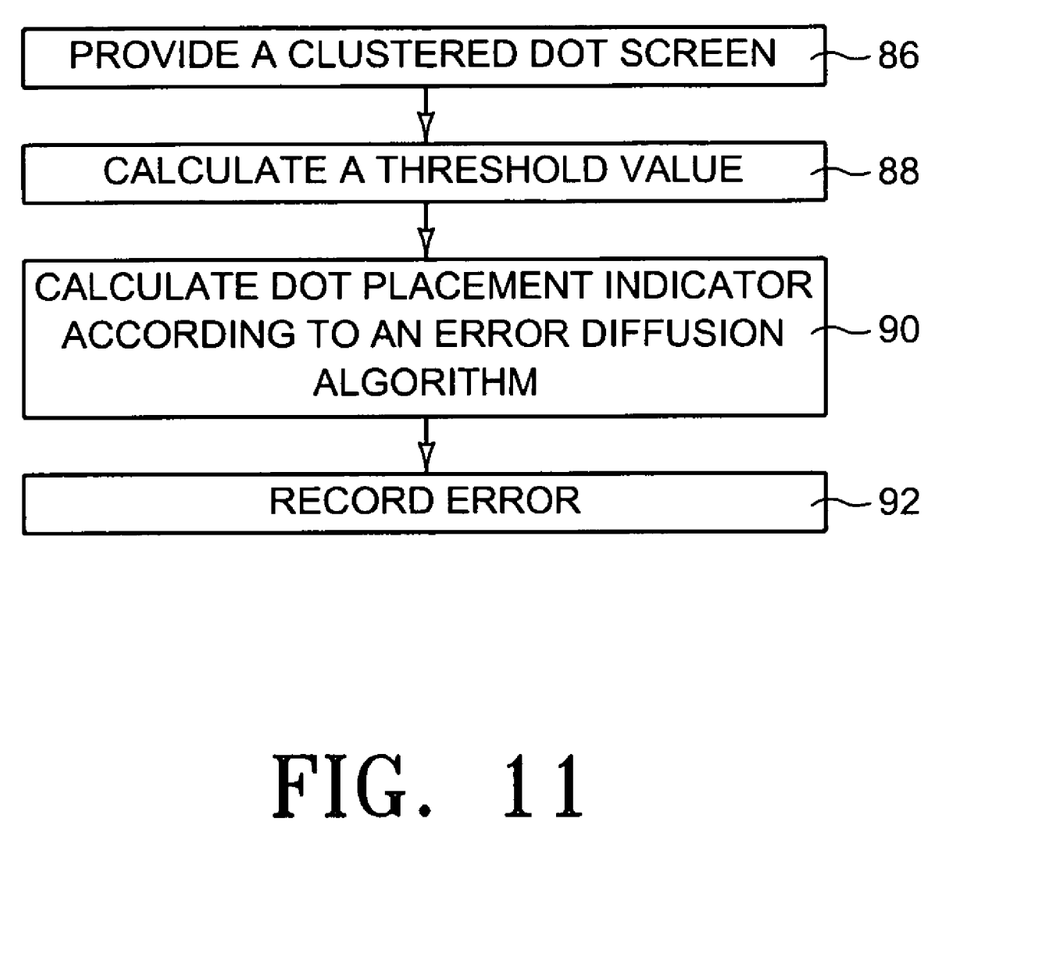
FIG. 11 is a flow diagram further illustrating steps taken to calculate a dot placement indicator according to an embodiment of the present invention.

Operation: The operation of embodiments of the present invention will now be described with reference to FIGS. 9-11. FIG. 9 is an exemplary flow diagram illustrating steps taken to produce a halftone according to an embodiment of the present invention. FIGS. 10 and 11 are exemplary flow diagrams that help illustrate steps taken to generate and print a halftone according to an embodiment of the present invention.

Starting with FIG. 9, for each pixel of a digital image, a pixel intensity is obtained (step 52). For a gray scale digital image, intensity is synonymous with gray level. Dot density is modulated according to pixel intensity (step 54). Dot cluster size is controlled according to pixel intensity (step 56). Dot size is also modulated according to pixel intensity (step 58). With reference to the examples above, steps 54 and 56 can be accomplished by placement control 38 (see FIGS. 4-6). Step 58 can be accomplished by size control 40 using output generated by placement control 38.

FIG. 10 illustrates steps taken to produce and print a halftone according to an embodiment of the present invention. Initially, a print job is generated (step 60). Referring back to FIG. 1, this step can be accomplished using software running on computer 12 to generate and send the print job to image forming device 16. Alternatively, where image forming device 16 is a copier, step 60 may be accomplished using image forming device 16 alone. The print job is then rasterized creating one or more digital images (step 62). For each digital image, a variable X is set to equal the number of pixel columns in the digital image while a variable Y is set to equal the number of pixel rows (step 64). Variables m and n are each set to equal one (step 66). The variable m represents the column of a particular pixel being analyzed while n represents the row.

The intensity value, I(m,n) is acquired for pixel, P(m,n) (step 68) and cluster factor C(m,n), density factor D(m,n), and size factor, S(m,n) are retrieved (step 70). Referring back to FIGS. 4 and 5, steps 60 and 62 can be performed by LUT controller 48. Dot placement indicator, B(m,n) is calculated as a function of C(m,n) and D(m,n) (step 72). Step 72, can be performed by placement control 38 which sets the value of B(m,n) to one if a dot is to be placed and to zero if not. Next halftone print code HPC(m,n) is generated as a function of B(m,n) and S(m,n) (step 74). Steps 72 and 74 will be discussed in more detail below.

Halftone print code, HPC(m,n) is sent to print engine 24 (step 76)—the code indicates whether or not a dot is to be placed and the size of the dot if it is to be placed. The variable m is increased by one (step 78). It is determined if the variable m exceeds X (step 80). If not, the process jumps back to step 68 so that the remainder of row n can be processed. Otherwise, the variable m is set to one and the variable n is increased by one (step 82). It is determined if the variable n exceeds Y (step 84). If not, the process jumps back to step 68 so that row n can be processed. Otherwise, all columns and rows have been processed.

FIG. 11 expands on step 72 of FIG. 10. As noted above, dot placement indicator, B(m,n), can be calculated using an error diffusion algorithm. FIG. 11 helps illustrate an example of an error diffusion algorithm modified according to an embodiment of the present invention. A clustered dot screen is provided (step 86)—the dot screen like the digital image having pixels arranged in X columns and Y rows. A threshold value (to compare against P(m,n)) is calculated in step 88 according to the equation: $T(m,n)=T_o+C(m,n)*D_s(m,n)$. $T_o$ represents a default threshold value, and $D_s(m,n)$ represents a density factor for dot screen pixel (m,n). $T_o$, for example, may be a fixed value or it may be a function of D(m,n).

Using T(m,n) as a threshold value, dot placement indicator B(m,n) is calculated according to an error diffusion algorithm (step 90). As discussed above, the value of B(m,n) (one or zero) determines whether a dot will be placed in cell (m,n). B(m,n) is set to one if the adjusted value of density factor D(m,n) equals or exceeds threshold T(m,n). Otherwise, B(m,n) is set to zero.

D(m,n) is adjusted by adding to it weighted errors resulting from the processing of prior pixels of the digital image. As an example, when processing pixel (1,1) no other pixels have been processed. C(1,1) and D(1,1) are acquired according to the intensity value for P(1,1). Because no prior pixels have been processed, D(1,1) is not adjusted. T(1,1) is calculated and it is determined if D(1,1) equals or exceeds T(1,1). If it does, B(1,1) is set to one. Otherwise B(1,1) is set to zero. An error, e(1,1), can then be calculated by the equation: e(1,1)=D(1,1)−B(1,1). That error, e(1,1) can then diffused to one or more other pixels yet to be processed.

Referring back to the traditional error diffusion example discussed with reference to FIG. 8, D(m,n) might be adjusted by adding weighted errors resulting from the processing of four prior pixels of the digital image according to the following equation: $D_{adjusted}(m,n)=D(m,n)+W1*e(m-1,n)+W2*e(m+1,n-1)+W3*e(m,n-1)+W4*e(m-1,n-1)$. The values of each weighting factor may, for example, be fixed or dependent upon the value of D(m,n).

With the value of B(m,n) set, an error, e(m,n), can be calculated and recorded (step 92). The recorded error (e(m,n)=$D_{adjusted}$(m,n)−B(m,n)) can then be used when processing subsequent pixels. It is noted that where the choice of values for dot placement indicator, B(m,n), are zero and one, the value of a dot density factor, D(m,n), will be within a set of values ranging from zero to one.

With dot placement indicator B(m,n) set, halftone print code HPC(m,n) can be calculated in step 74 (FIG. 10) according to the equation: PC(m,n)=S(m,n)*B(m,n). HPC(m,n) is sent to print engine 24 in step 76, and the next pixel is processed by repeating steps 68-74 of FIG. 10.

Look-Up Tables: Using the process described above, a pixel's intensity value, I(m,n), is used to acquire a cluster factor, C(m,n), a dot density factor, D(m,n), and a dot size factor, S(m,n). These factors, acquired from look-up tables (LUTs 42-46 shown in FIGS. 4 and 5, are then used to generate a halftone print code HPC(m,n) for that pixel. These look-up tables, dot cluster LUT 42, dot density LUT 44, dot size LUT 46, should be designed so that a desired level of absorptance can be obtained for each possible pixel intensity value, I(m,n). The tables can also be designed to help optimize a variety of printing attributes including print quality and print stability. Therefore, it is possible to achieve improved quality rendering of a desired absorptance by varying the various factors, C, D, and S, within the three LUTs 42-46.

There are two important quantities that can be considered when designing LUTs 42-46. The first quantity is the output tone level, T(C,D,S), at cluster factor C, dot density D, and dot size S. Here we assume that T(C,D,S) is linear in absorptance, so that T(C,D,S)=1 is a perfect black and T(C,D,S)=0 is white. Intermediate values of T(C,D,S) vary linearly with luminance Y. The other quantity is print distortion, U(C,D,S) which specifies the print quality of intensity level U(C,D,S) rendered with the triple (C,D,S). The particular definition of U(C,D,S) depends on the specific printing application and the printing artifacts to be avoided such as banding and moiré artifacts. An overriding objective is to select the triple (C,D,S) for each input intensity level that gives the best print quality subject to a constraint that the tone T(C,D,S) is correct.

For each set of parameters, C and S, a tone curve can be measured as a function of the dot density D. This is done by printing a test pattern of gray patches in randomized spatial positions with values of D ranging from 0 to 1 and constant values of the parameter pairs (C,S). The tone of each patch is then measured to obtain the function T(C, . . . ,S). Let A(I) be the desired tone curve where I is an intensity level between 0 and 255. Then, for each parameter pair (C,S) the tone correction curve $R_{CS}(I)$ is computed with the property that:

$$T(C, R_{CS}(I), S)=A(I)$$

Notice that for each fixed dot size S and cluster factor C, T(C,D,S) is a monotone increasing function of the dot density D. Therefore, T(C,D,S) can be inverted with respect to D. We denote this inverse function by $T_{C,S}^{-1}(.)$. A dot density curve can be computed according to the equation:

$$R_{C,S}(I)=T_{C,S}^{-1}(A(I))$$

This dot density curve is referred to as the tone compensation curve for dot size S and cluster factor C. In practice, some absorptance levels may not be achievable for certain dot size values S, even when the dot density is chosen to be its maximum value, $D_{max}$. In this case A(I) exceeds $T(C, D_{max}, S)$, and $R_{CS}$ is set to equal $D_{max}$.

After determining $R_{CS}(I)$, the print distortion of rendering intensity level I with the triple $(C, R_{CS}(I), S)$ can be observed. Let $(C^{(j)}, S^{(j)})$ where j and i each range in value from zero to N, represent the set of possible cluster and size factor values from which to choose. For each pair $(C^{(j)}, S^{(j)})$, a gray ramp is printed using the parameter triple $(C^{(j)}, R_{C^{(j)},S^{(j)}}, S^{(j)})$. This gray ramp is designed to achieve the desired tone curve A(I). For each intensity value, I, the values of j and i are selected that produced the best print quality at that intensity level. The indices j and i corresponding to this best quality output are designated as i(I) and j(I). These two indices are a function of intensity level I because, in general, the best choice of C and S will be different for each value of intensity level I.

One approach to select the best values of C and S is to visually inspect the print samples and selecting the ramp with the best appearance. This subjective evaluation can be based on the following objective considerations. First, the printed patch should have good print stability. More specifically, this means it should be resistant to the banding artifacts and intensity level discontinuities. Second, the printed patch should be smooth with an absence of grain. Third, the halftoning algorithm at each gray level should be resistant to Moiré artifacts.

The following guidelines can be used in selecting the values of C and S that would achieve these objectives. In the highlight regions, the dominant artifacts are visible isolated dots. Therefore, it is generally desirable to use smaller dot size in these regions. Moreover, C=0 is preferred for highlight regions in order to retain the "blue noise" dispersed-dot distribution. For the midtone and shadow areas, print stability artifacts, such as banding, become more dominant. Thus, we prefer larger C values to generate larger dot clusters which are more stable for electro-photographic printing. However, if a C value is too large, it can compromise Moiré resistance. Therefore, a tradeoff must be made between print stability and Moiré resistance. To further enhance the stable formation of dot clusters, the following rule can be applied for dot size selection: if the cluster factor C>0, the dot size factor S should at its maximum.

Once the values of i(I) and j(I) are selected, cubic spline interpolation is used to generate the dot size curve $S_I$ and the cluster curve $C_I$ for intensity values ranging from zero to two hundred fifty-five. The dot density curve is computed as $D_I=R_{CI,SI}(I)$. It can be beneficial that the cluster, dot density, and dot size curves ($C_i$, $D_I$, and $S_I$) each vary smoothly in order to avoid contouring artifacts when rendering slowly varying image regions.

Conclusion: The diagrams of FIGS. 2-6 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskette or hard drives, a random access memory (RAM), a read-only memory (ROM), an erasable programmable read-only memory, or a portable compact disc.

Although the flow diagrams of FIGS. 9, 10 and 11 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A method for generating a halftone from a plurality of pixels, comprising, for at least one pixel:
   modulating dot density;
   controlling dot cluster size; and
   modulating dot size according to the pixel's intensity;
   wherein controlling dot cluster size comprises obtaining a cluster factor corresponding to the pixel's intensity and calculating a threshold value as a function, at least in part, of a dot screen and the cluster factor, and modulating dot density comprises implementing an error diffusion algorithm that is a function, at least indirectly, of the pixel's intensity and the threshold value.

2. The method of claim 1, further comprising obtaining a dot density factor corresponding to the pixel's intensity, and wherein implementing an error diffusion algorithm comprises implementing an error diffusion algorithm that is a function, at least in part, of the dot density factor and the threshold value.

3. The method of claim 1, further comprising obtaining a dot size factor corresponding to the pixel's intensity and wherein:
   implementing the error diffusion algorithm generates a dot placement indicator; and
   modulating dot size comprises generating a halftone print code as a function of the dot size factor and the dot placement indicator.

4. The method of claim 1, wherein for each pixel:
   modulating dot density comprises obtaining a dot density factor corresponding to the pixel's intensity and implementing an error diffusion algorithm that is a function of the dot density factor and the threshold value to generate a dot placement indicator; and
   modulating dot size comprises obtaining a dot size factor corresponding to the intensity value and generating a halftone print code as a function of the dot size factor and the dot placement indicator.

5. The method of claim 4, wherein:
   obtaining a cluster factor comprises locating a first look-up table entry corresponding to the pixel's intensity and acquiring the cluster factor from that first entry;
   obtaining a dot density factor comprises locating a second look-up table entry corresponding to the pixel's intensity and acquiring the dot density factor from that second entry; and
   obtaining a dot size factor comprises locating a third look-up table entry corresponding to the pixel's intensity and acquiring the dot size factor from that third entry.

6. The method of claim 5, wherein the first, second, and third entries are a single look-up table entry.

7. The method of claim 4, wherein:
   obtaining a cluster factor comprises calculating the cluster factor according to the pixel's intensity;
   obtaining a dot density factor comprises calculating the dot density factor according to the pixel's intensity; and obtaining a dot size factor comprises calculating the dot size factor according to the pixel's intensity.

8. A method for generating a halftone from a plurality of pixels, comprising for at least one pixel:
   obtaining a cluster factor corresponding to the pixel's intensity and calculating a threshold value as a function of a dot screen and the cluster factor;
   obtaining a dot density factor corresponding to the pixel's intensity and implementing an error diffusion algorithm that is a function of the dot density factor and the threshold value to generate a dot placement indicator; and
   obtaining a dot size factor corresponding to the intensity value and generating a halftone print code as a function of the dot size factor and the dot placement indicator.

9. A computer readable medium having computer executable instructions for causing a print engine to generate a halftone, the medium including instructions for, for at least one pixel:
   modulating dot density;
   controlling dot cluster size; and
   modulating dot size according to the pixel's intensity;
   wherein controlling dot cluster size comprises obtaining a cluster factor corresponding to the pixel's intensity and calculating a threshold value as a function, at least in part, of a dot screen and the cluster factor, and modulating dot density comprises implementing an error diffusion algorithm that is a function, at least indirectly, of the pixel's intensity and the threshold value.

10. The medium of claim 9, having further instructions for obtaining a dot density factor corresponding to the pixel's intensity, and wherein the instructions for implementing an error diffusion algorithm include instructions for implementing an error diffusion algorithm that is a function, at least in part, of the dot density factor and the threshold value.

11. The medium of claim 9, having further instructions for obtaining, for at least one of a plurality of pixels, a dot size factor corresponding to the pixel's intensity and wherein the instructions for:
   implementing the error diffusion algorithm generates a dot placement indicator; and
   modulating dot size include instructions for generating a halftone print code as a function of the dot size factor and the dot placement indicator.

12. The medium of claim 9, wherein the instructions for:
   modulating dot density include instructions for obtaining a dot density factor corresponding to the pixel's intensity and implementing an error diffusion algorithm that is a function of the dot density factor and the threshold value to generate a dot placement indicator; and
   modulating dot size include instructions for obtaining a dot size factor corresponding to the intensity value and generating a halftone print code as a function of the dot size factor and the dot placement indicator.

13. The medium of claim 12, wherein the instructions for:
   obtaining a cluster factor include instructions for locating a first look-up table entry corresponding to the pixel's intensity and acquiring the cluster factor from that first entry;
   obtaining a dot density factor include instructions for locating a second look-up table entry corresponding to the pixel's intensity and acquiring the dot density factor from that second entry; and
   obtaining a dot size factor include instructions for locating a third look-up table entry corresponding to the pixel's intensity and acquiring the dot size factor from that third entry.

14. The medium of claim 13, wherein the first, second, and third entries are a single look-up table entry.

15. The medium of claim 12, wherein the instructions for:
   obtaining a cluster factor include instructions for calculating the cluster factor according to the pixel's intensity;
   obtaining a dot density factor include instructions for calculating the dot density factor according to the pixel's intensity; and
   obtaining a dot size factor include instructions for calculating the dot size factor according to the pixel's intensity.

16. A computer readable medium having computer executable instructions for causing a print engine to generate a halftone, the medium including instructions for:
   for at least one of a plurality of pixels, obtaining a cluster factor corresponding to the pixel's intensity and calculating a threshold value as a function of a dot screen and the cluster factor;
   obtaining a dot density factor corresponding to the pixel's intensity and implementing an error diffusion algorithm that is a function of the dot density factor and the threshold value to generate a dot placement indicator; and
   obtaining a dot size factor corresponding to the intensity value and generating a halftone print code as a function of the dot size factor and the dot placement indicator.

17. A halftoning system, comprising:
   a placement control operable to modulate a dot density according to pixel intensity and to control a size of a dot cluster according to pixel intensity;
   a size control operable to modulate a dot size according to pixel intensity; and
   a look-up table control operable to acquired a cluster factor from a look-up table of cluster factors, the acquired cluster factor corresponding to a given pixel's intensity, and wherein the placement control is operable to calculate a threshold value as a function, at least in part, of a dot screen and the cluster factor and to implement the error diffusion algorithm that is a function, at least indirectly, of the pixel's intensity and the threshold value.

18. The system of claim 17, wherein the look-up table control is operable to acquire a dot density factor from a dot density look-up table, the acquired dot density factor corresponding to a given pixel's intensity, and wherein the placement control is operable to implement the error diffusion algorithm that is a function, at least in part, of the dot density factor and the threshold value.

19. The system of claim 17:
   wherein the placement control is operable to implement the error diffusion algorithm to generate a dot placement indicator; and
   wherein the size control is operable to modulate a dot size by generating a halftone print code as a function of the dot size factor and the dot placement indicator.

20. The system of claim 17, wherein:
   the placement control is operable to modulate a dot density by implementing an error diffusion algorithm that is a function of the threshold value and a dot density factor corresponding to the pixel's intensity in order to generate a dot placement indicator; and
   the size control is operable to modulate a dot size by generating a halftone print code that is a function of the dot placement indicator and a dot size factor corresponding to the pixel's intensity.

21. The system of claim 20, further comprising:
   the look-up table control is operable to acquire a dot density factor from a dot density look-up table and to acquire a dot size factor from a dot size look-up table, the look-up table control operable to acquire each factor from a look-up table entry corresponding to a given pixel's intensity.

22. The system of claim 21 wherein the dot cluster look-up table, the dot density look-up table, and the dot size look-up table are a single look-up table.

23. The system of claim 20, wherein:
the placement control is operable to generate the cluster factor and the dot density factor according to the pixel's intensity; and
the size control is operable to generate a dot size factor according to the pixel's intensity.

24. A halftoning system, comprising:
a look-up table control operable to obtain a cluster factor corresponding to the intensity of a given pixel, a dot density factor corresponding to the pixel's intensity, and a dot size factor corresponding to the pixel's intensity;
a placement control operable to calculate a threshold value as a function of a dot screen and the cluster factor, and to implement an error diffusion algorithm that is a function of the dot density factor and the threshold value in order to generate a dot placement indicator; and
a size control operable to generate a halftone print code as a function of the dot size factor and the dot placement indicator.

25. The system of claim 24, wherein the look-up table control, the placement control, and the size control are programs executed by an image forming device having a print engine operable to produce a halftone according to the halftone print code.

26. An image forming device, comprising:
a print engine operable to receive halftone print code and to produce a printed halftone;
a first look-up table having a plurality of entries, each entry corresponding to a pixel intensity and containing a cluster factor corresponding to that pixel intensity;
a second look-up table having a plurality of entries, each entry corresponding to a pixel intensity and containing a dot density factor corresponding to that pixel intensity;
a third look-up table having a plurality of entries, each entry corresponding to a pixel intensity and containing a dot size factor corresponding to that pixel intensity;
a look up table control operable, using a known pixel intensity, to acquire corresponding cluster, dot density, and dot size factors from the first, second, and third look-up tables;
a placement control operable to calculate a threshold value as a function of a dot screen and an obtained cluster factor and to implement an error diffusion algorithm that is a function of an obtained dot density factor and the threshold value in order to generate a dot placement indicator; and
a size control operable to generate and send a halftone print code to the print engine, the halftone print code being generated as a function of an obtained dot size factor and the dot placement indicator.

27. A system for generating a halftone from a plurality of pixels, comprising, for at least one pixel:
a means for modulating dot density;
a means for controlling a size of a dot cluster; and
a means for modulating dot size according to pixel intensity;
the means for controlling dot cluster size comprises means for obtaining a cluster factor corresponding to the pixel's intensity and calculating a threshold value as a function, at least in part, of a dot screen and the cluster factor, and the means for modulating dot density comprises means for implementing an error diffusion algorithm that is a function, at least indirectly, of the pixel's intensity and the threshold value.

* * * * *